(12) United States Patent
    Zhang et al.

(10) Patent No.: US 8,068,673 B2
(45) Date of Patent: Nov. 29, 2011

(54) RAPID AND HIGH PRECISION CENTROIDING METHOD AND SYSTEM FOR SPOTS IMAGE

(75) Inventors: Guangjun Zhang, Beijing (CN); Jie Jiang, Beijing (CN); Qiaoyun Fan, Beijing (CN); Xuetao Hao, Beijing (CN)

(73) Assignee: Beihang University, Beijing (CN)

( * ) Notice: Subject to any disclaimer, the term of this patent is extended or adjusted under 35 U.S.C. 154(b) by 1112 days.

(21) Appl. No.: 11/687,338

(22) Filed: Mar. 16, 2007

(65) Prior Publication Data

US 2008/0131002 A1    Jun. 5, 2008

(30) Foreign Application Priority Data

Dec. 1, 2006  (CN) .......................... 2006 1 0161802

(51) Int. Cl.
    *G06K 9/66* (2006.01)
(52) U.S. Cl. ................ 382/190; 382/288; 382/103
(58) Field of Classification Search ................ 382/190, 382/103, 288
    See application file for complete search history.

(56) References Cited

U.S. PATENT DOCUMENTS

| | | | | |
|---|---|---|---|---|
| 5,815,150 | A * | 9/1998 | Shimizu ........................ | 715/764 |
| 6,650,766 | B1 * | 11/2003 | Rogers et al. .................. | 382/132 |
| 2001/0008562 | A1 * | 7/2001 | Rogers et al. .................. | 382/132 |
| 2003/0071819 | A1 * | 4/2003 | Kondo et al. .................. | 345/556 |
| 2003/0086063 | A1 * | 5/2003 | Williams et al. .............. | 351/221 |
| 2004/0001074 | A1 * | 1/2004 | Oyaizu ........................ | 345/633 |
| 2005/0232483 | A1 * | 10/2005 | Kato et al. .................... | 382/171 |
| 2006/0103663 | A1 * | 5/2006 | Collodi ........................ | 345/611 |
| 2007/0159627 | A1 * | 7/2007 | Johnson ........................ | 356/335 |

* cited by examiner

*Primary Examiner* — Jason M Repko
*Assistant Examiner* — Patrick Edwards
(74) *Attorney, Agent, or Firm* — Workman Nydegger

(57) ABSTRACT

The disclosure relates to a rapid and high precision centroiding method for spots image comprising the following steps. First, the method requires convoluting the gray value of a pixel with a Gaussian filter and judging whether the result thereof exceeds a predetermined threshold. If the value exceeds the predetermined threshold, the method requires marking the current pixel with a flag to identify which spot it belongs to, and then accumulating the product of the gray value and a coordinate value of the same spot; and at the same time, accumulating the gray value of the same spot; and saving the results of the accumulation respectively. If the gray value of the pixel does not exceed the predetermined threshold, the method requires marking the current pixel as a background flag. After all pixels of the image has been disposed of completely, the method includes calculating a quotient of the accumulations of the product of the gray value and the coordinate value and the accumulations of the gray value, and outputting the quotients. At the same time, a centroiding system for spots image is also presented.

5 Claims, 5 Drawing Sheets

RAPID AND HIGH PRECISION CENTROIDING METHOD AND SYSTEM FOR SPOTS IMAGE

CROSS-REFERENCE TO RELATED APPLICATIONS

This application claims priority from Chinese Patent Application Serial No. 200610161802.6 filed Dec. 1, 2006, the disclosure of which, including the specification, drawings and claims, is incorporated herein by reference in its entirety.

TECHNICAL FIELD

The present disclosure relates to measurement technology of machine vision. In particular, the disclosure relates to a rapid and high precision centroiding method and system for spots image.

BACKGROUND

Spots image is the common image information in the field of machine vision and pattern recognition. The character of the spot image is the center of the spot. The spot center is widely used in object tracking in machine vision, high accuracy 3D measurement in vision and celestial navigation.

At present, there are two known methods of locating the center of the spot's image, one is based on the gray value of the pixels, and another is based on the edge. The information of the distribution of the gray value of the spots image is made use by a locating method which is based on the gray value, such as a centroiding algorithm and a curved surface fitting, method etc. The information regarding the shape of the edge is always used by the locating method which is based on the edge, including circle fitting, Hough transform etc.

The method which is based on the gray value has higher accuracy than the method which is based on the edge. Usually, the method of curved surface fitting fits the gray value distribution of the spots image by a 2D Gaussian curved surface, so the method is too complicated. The centroiding algorithm is used most frequently, due to its easy implementation and its high precision. The centroiding algorithm has some improved forms, mainly including the centroiding algorithm with a threshold value and the square weighted centroiding algorithm. The centroiding algorithm with threshold value is to subtract the background threshold from the original image, calculating the centroiding of the pixels which exceeds the threshold value. The square weighted centroiding algorithm uses the square of the gray value to replace the gray value and highlights the influence of the gray value nearer to the center of the spot.

In the prior art, for real-time application in vision dynamic tracking and the requirement of miniaturization in space application, spot centroiding which is to handle a mass of data and the processing exists in parallel, including operation parallelism, image parallelism, neighborhood parallelism, the pixel position parallelism and so on. But at present, the method of the spot centroiding is implemented mostly by the software in the computer. The implementation is done by instruction and is serial, so spot centroiding becomes the bottleneck of the image processing. For real-time spot centroiding, the system of on-chip windowed centroiding is proposed by Jet Propulsion Laboratory ("JPL"), neuro-MOS circuits have been implemented and integrated with a complementary metal oxide semiconductor ("CMOS") active pixel sensor ("APS"). More than two windows are set to locate spots centroid at the same time by the system. But due to the analog circuit and windowed processing, some disadvantages are as follows:

1) The window can not be set too large otherwise when more than two spots exist in one window, the two spots will be calculated as one spot which will skew the result with this error. Thus, the approximate position and the range must be known ahead to set the window.

2) Because of the limitation of the process and transmission speed, the number of windows can not be too much, so some spot's centroid can not be calculated 3) Because of implementation with the analog circuit, the centroiding algorithm is sensitive to noise which is the source of the error thereof.

SUMMARY

An embodiment of the present disclosure provides a rapid and high precision centroiding method for spots image, which improves the speed of data processing and the ability of noise-resistance and processing any size and any number of spots.

An embodiment of this disclosure also provides a rapid and high precision centroiding system for spots image, which reduces the bottleneck of image preprocessing and the problem of noise sensitivity. Further, the disclosure also describes a system that processes any size and any number of spots in real-time.

For these purposes, in one embodiment of the disclosure, a method is disclosed for rapid and high precision centroiding for spots image. First, the method requires convoluting the gray value of a pixel with a Gaussian filter and judging whether the result thereof exceeds a predetermined threshold. If the value exceeds the predetermined threshold, the method requires marking the current pixel with a flag to identify which spot it belongs to, and then accumulating the product of the gray value and a coordinate value of the same spot; and at the same time, accumulating the gray value of the same spot; and saving the results of the accumulation respectively. If the gray value of the pixel does not exceed the predetermined threshold, the method requires marking the current pixel as a background flag. After all pixels of the image have been disposed of completely, the method includes calculating a quotient of the accumulations of the product of the gray value and the coordinate value and the accumulations of the gray value, and outputting the quotients. At the same time, a centroiding system for spots image is also presented.

A rapid and high precision centroiding system for spots image is also disclosed.

BRIEF DESCRIPTION OF THE DRAWINGS

The accompanying drawings, which are incorporated in and constitute a part of specification, illustrate an exemplary embodiment of the present invention and, together with the general description given above and the detailed description of the preferred embodiment given below, serve to explain the principles of the present invention.

DETAILED DESCRIPTION

Figure 1:
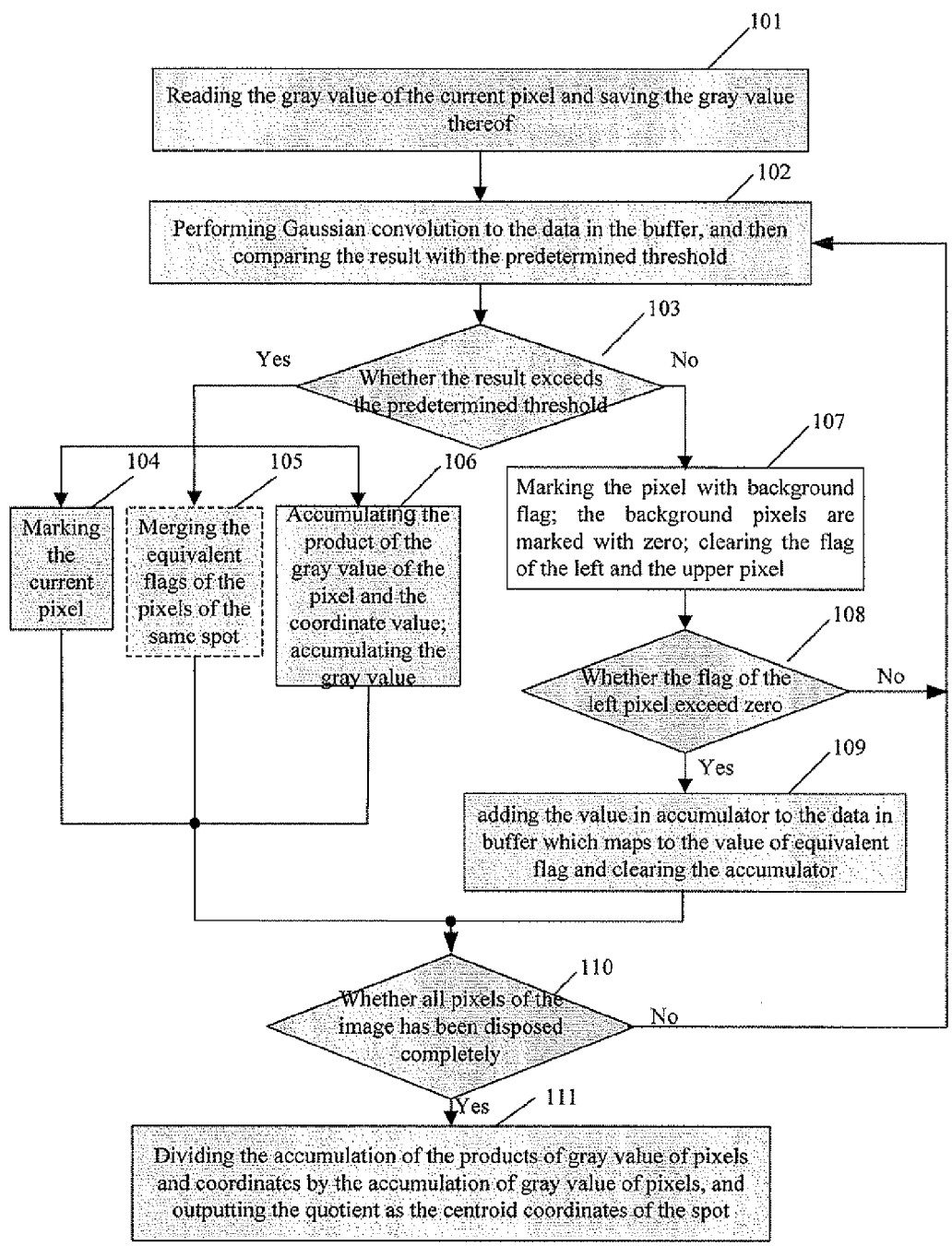
FIG. 1 illustrates a flowchart of centroiding for spots image.

While the claims are not limited to the illustrated embodiments, an appreciation of various aspects of the present invention is best gained through a discussion of various examples thereof. Referring now to the drawings, illustrative embodiments will be described in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

The principle of this disclosure is as follows. First, a gray value of a pixel of output from a sensor is convoluted with a Gaussian filter. By marking and calculating each pixel of the output image correspondingly, one or more spots images can be automatically identified and disposed of quickly.

The steps of marking and calculating are as follows. First, each output pixel is compared with a predetermined threshold and marked. Next, equivalent flags that belong to the same spots are merged together if it is necessary to guarantee that each pixel of the same spots have the same flag. The product of the gray value and a coordinate value of the pixels are summed together when marking and merging. After processing all pixels of the image, a quotient of the product of the gray value and the coordinate value of the gray value of pixels is calculated, then the results is output as a coordinate of a spot centroid. Thus, rapid and high precision centroiding is realized for any shape and any number spots The centroiding process of the prior art shows that noise may greatly influence the precision of the process, so Gaussian weighing is used in the present disclosure. More specifically, the gray value of pixels is convoluted with the Gaussian filter in formula (1), and the results instead of the gray value of pixels are used to calculate further.

$$I(x, y) = \sum_{i=-\frac{k}{2}}^{\frac{k}{2}} \sum_{j=-\frac{k}{2}}^{\frac{k}{2}} F(x+i, y+j) g(i, j) \quad (1)$$

F(x,y)—the gray value of the output image,
l(x,y)—the results of the Gaussian convolution,
g(i,j)—the coefficient of the Gaussian convolution.

A detailed flow of the method for centroiding for spots is illustrated in FIG. 1.

The steps are follows:

Step 101: First, the gray value of the current pixel is read and saved.

A buffer for the gray value is determined according to the size of a Gaussian convolution template. More specifically, the buffer is determined by the row number. Thus, for example, if the size of the Gaussian convolution template is 7×7, 6 rows are saved once, and processing begins after reading the data of the 7th row.

Step 102~103: Next, Gaussian convolution to the data in the buffer is performed, and then the result is compared with a predetermined threshold. If the result exceeds the threshold, considering the current pixel as the spot, then the process proceeds to step 104 to identify the spot. If the result does not exceed the threshold, the current pixel is considered as the background, and the process proceeds to step 107.

In the preferred embodiment, the Gaussian convolution is also based on the Gaussian convolution template. For example, if the size of the Gaussian convolution template is 7×7, the image data to be processed includes 7 rows and 7 columns pixels once. Usually, the operations of convolution start at the beginning of the pixel, then scan from left to right and from top to bottom. The convolution is carried out as Formula 1. The threshold is determined by the contrast of the gray value of spots with the background. Usually, the lesser the contrast is the lesser the threshold is, and vice versa.

Step 104: At step 104, the current pixel is marked, and the spots to which the pixels belong are identified.

The background pixels can be marked with zero and the non-background pixels can be marked with non-zero. In applications there are may ways to mark and is limited to the particular method disclosed herein. Rather, the purpose of the marking is to distinguish the background, the non-background and the spots, so a negative integer or a decimal can also be used. Usually, zero and use of a positive integer would be convenience. The steps described below are based on using zero and a positive integer to mark the background and non-background pixels, respectively.

Figure 2:
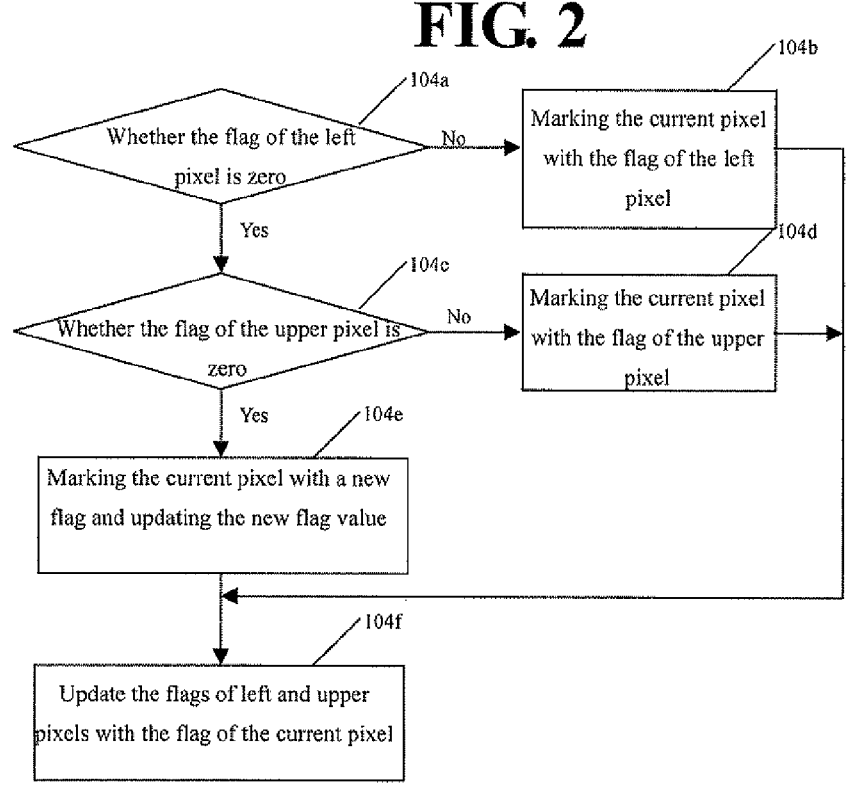
FIG. 2 illustrates a flowchart for marking pixels according to the process flow set forth in FIG. 1.

The workflow for marking each pixel is illustrated in FIG. 2.

Step 104a~104b, First, the process judges whether the flag of the left pixel is zero. If so, the process proceeds to step 104c. If not, the flag of the current pixel is the flag of the left pixel, then the process proceeds to step 104f.

Step 104c~104e: At step 104c, the process next judges whether the flag of the upper pixel is zero. If so, the current pixel is marked with a new flag and the new flag value is updated. If the flag of the upper pixel is not zero, the flag of the current pixel is the flag of the upper pixel.

In order to supply the new flag value to the pixel, the new flag value can be saved in a special register. The new flag value can be updated by any way to provide a different value each time. For example, the new flag adds 1 to the new flag value for the next marking operation.

Step 104f: At step 104f, the flags of the left and upper pixels are updated with the flag of the current pixel for the next pixel and the next row of pixels.

The flag values of left and upper pixels are saved in a register and a buffer respectively. The left register is initialized to be zero. And the buffer, which saves the flags of pixels in a row, also is initialized to be zero. For example, in a case where there are ten pixels in a row, the buffer will have ten units, with each unit representing a pixel in the row. When the flag of the current pixel is determined, then the flag is saved to the relevant buffer unit. If the current pixel is the 5th pixel in the row, then the flag will be saved to the 5th unit of the buffer. The flag of the upper pixel for marking comes from the buffer.

Figure 3:
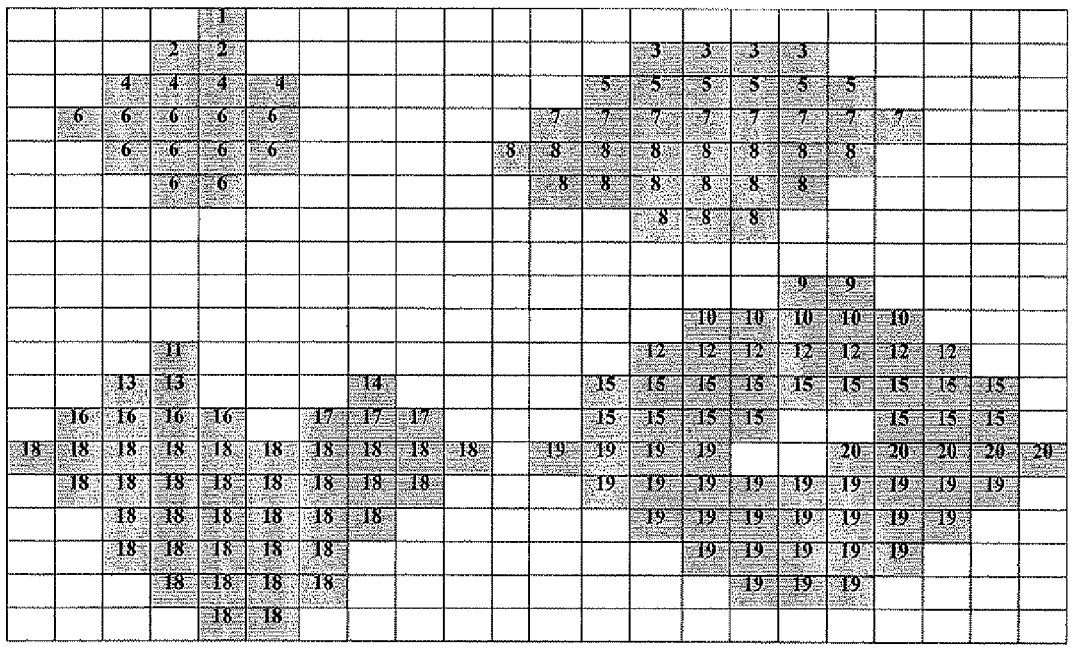
FIG. 3 is a schematic drawing of spots images that are marked.

Step 104a~104f illustrate the process of marking one pixel. The steps 104a~104f are thus repeated for marking all output pixels. For example, as shown in FIG. 3, with respect to the pixel in 2nd row, 4th column, because the flag of the left pixel is zero, then the flag of the upper pixel is zero. Therefore, the pixel is marked as a new flag 2. In respect to the pixel in 2nd row 5th column, because the flag of left pixel is 2, the pixel is directly marked as 2.

Step 105: Referring back to FIG. 1, at step 105, the equivalent flags of the pixels of the same spot are merged together.

Figure 4:
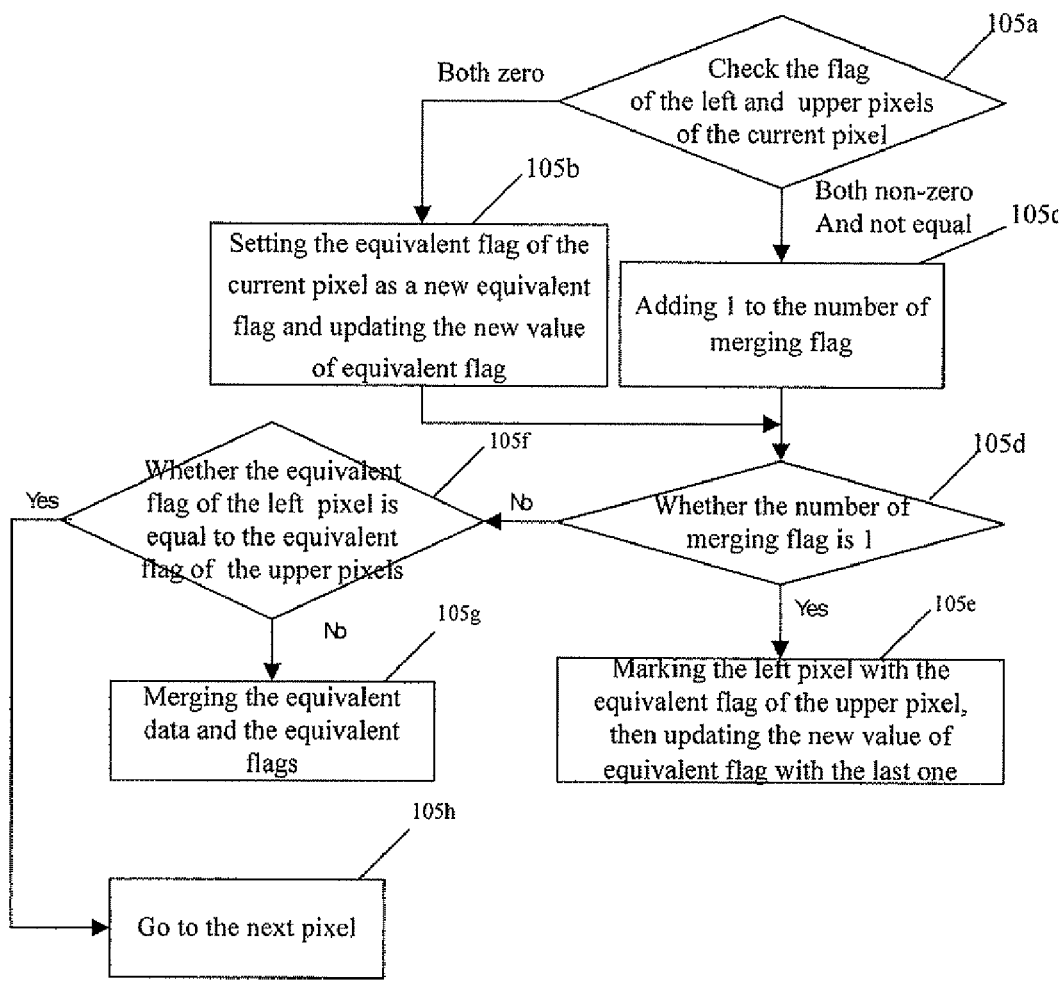
FIG. 4 illustrates a flowchart for merging equivalent flags according to the process flow set forth in FIG. 1.

FIG. 3 illustrates the image that is marked in step 104. The shaded areas of FIG. 3 are spots, and there are 4 spots in FIG. 3. The pixels of the same spot may have different flags, so these flags are equivalent. In order to unify the flags of all the pixels of the same spot, a method for merging equivalent flags is presented in this disclosure, as shown in FIG. 4. The purpose is to set a same flag of pixels for the same spot. If the background flags of pixels are marked zero, the same values are positive integers starting from 1. The workflow is shown in FIG. 4 and includes the following steps:

Step 105a~105c: At step 105a, a judgment is made as to whether both of the flags of the left and upper pixels are zero. If so, the corresponding equivalent flag of the current pixel is set as a new one and the new value of equivalent flag is updated. The process then proceeds to step 105d. If both of the flags of the left and upper pixels are not zero and if the two flags are not equal, a 1 is added to the number of the merging flag and the process then proceeds to step 105d.

In order to supply a new value of equivalent flags to the pixel, the new value of equivalent flags are saved in the special register. The new value of equivalent flags can be updated by any way to provide a different value each time. For example, the new value of equivalent flag is derived by adding 1 for the next marking. The number of merging flag records the number of equivalent flags which shall be merged, and saves the number in a register. The values of equivalent flag are saved in a buffer.

Step 105d~105h: At step 105d, a judgment is made as to whether the number of merging flag is 1. If so, the process then marks the left pixel with the equivalent flag of the upper pixel, and then updates the new value of the equivalent flag with the last one. If the step of updating of the new value of the equivalent flag is increasing the flag with 1, the last one is decreasing the flag by 1.

Because the new value of the equivalent flag is updated with the last one on the process of merging the equivalent flags, the range of the equivalent flag value is reduced. Each value of the equivalent flag maps to a data buffer address, so the reduction of the range greatly saves a lot of memory space. In FIG. 3, if the equivalent flag is not merged, it needs 19 buffer units to save all the spots, one flag needs one buffer unit, and lots of memory space is wasted. If the equivalent flag is merged, as shown in FIG. 5, only 4 buffer units are occupied.

If the number of merging flag is not 1, a judgment is made as to whether the value of the equivalent flag of the left pixel is equal to the value of equivalent flag of the upper pixel. If so, no additional action is taken. If the value of the equivalent flag of the left pixel is not equal to the value of the equivalent flag of the upper pixel, the equivalent data and the equivalent flag are merged. In the merging step, the data in the mapping buffer unit of the equivalent flag of the upper pixel is accumulated with the data in the mapping buffer unit of the equivalent flag of the left pixel and the buffer unit of the equivalent flag of the upper pixel mapping is then cleared. And the equivalent flag of the upper pixel is then replaced by the equivalent flag of the left pixel.

Figure 5:
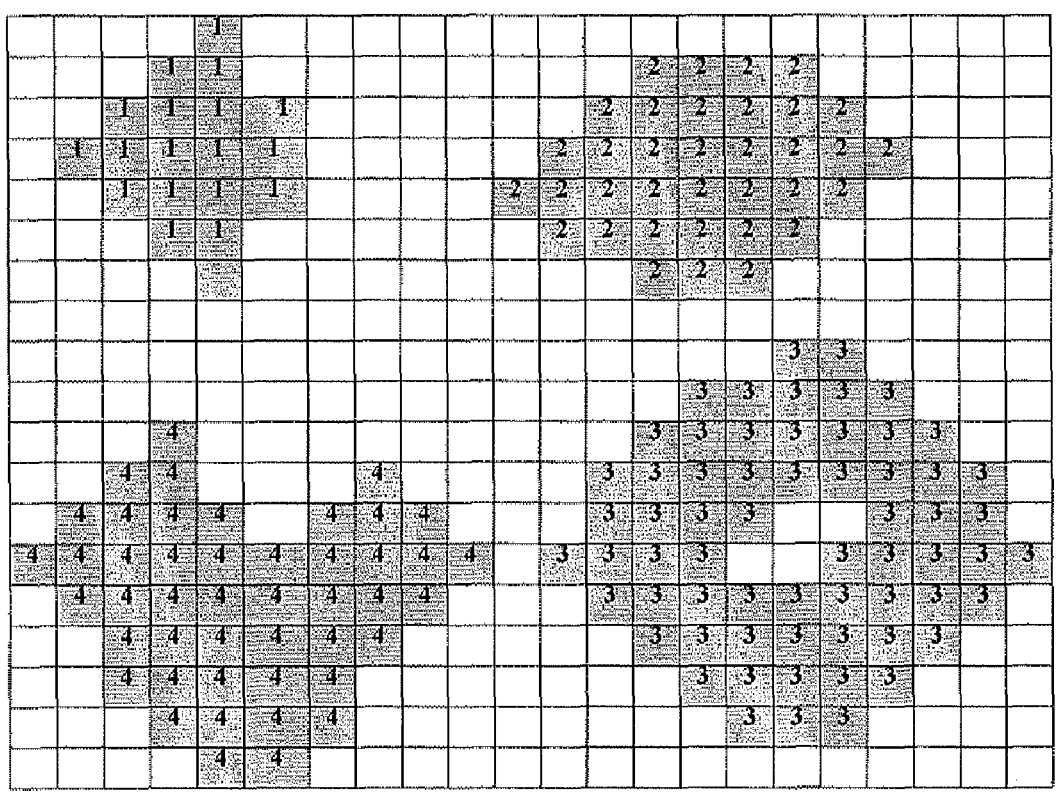
FIG. 5 is a schematic drawing of a spots image from FIG. 31 of which the equivalent flags are merged.

FIG. 5 illustrates the result of merging of the information from FIG. 3. The flags of the pixels in FIG. 5 are the real addresses in the buffer. For example, the flag of the pixel at the top left corner is 1, which means the data of the same spot with flag 1 is saved in the buffer unit which the address is 1.

In some applications, it is not necessary for the step of merging if all the pixels of the same spot have the same flag and the memory space is enough. Thus, step 105 is optional.

Step 106. At step 106, the product of the gray value of the pixel and the coordinate value of the same spot is accumulated. At the same time, the gray value of the same spot is accumulated and the results of the accumulating steps are saved, respectively. The process then proceeds to step 110.

In present disclosure, step 104, step 105 and step 106 can be done as parallel processes. Therefore the speed of processing can be improved greatly.

Step 107: In step 107, the pixel is marked with a background flag. In one embodiment, the background pixels are marked with zero; then the flag of the left and the upper pixel are cleared.

Step 108~109: In step 108, a judgment is made as to whether the flag of the left pixel exceeds zero. If so, the data storage of the spot to which the pixel belongs is adjusted. The detail of adjustment step is as follows: First, the value in accumulator is added to the data in buffer which maps to the value of the equivalent flag. Next, the accumulator is cleared. if the flag of the left pixel does not exceed zero, then the process proceeds to step 110.

Step 110: In step 110, a judgment is made as to whether all pixels of the image has been disposed completely. If so, the process proceeds to step 111. If all of the pixels have not been disposed of completely, to the process returns to step 101. A flag is set as an end indicator.

Step 111: At step 111, according to the Formula 2 below, the accumulation of the products of the gray value of pixels and coordinates by the accumulation of gray value of pixels is divided, and the quotient is outputted as the centroid coordinates of the spot.

$$x_0 = \frac{\sum_{x=1}^{n}\sum_{y=1}^{m} I(x, y)x}{\sum_{x=1}^{n}\sum_{y=1}^{m} I(x, y)} \qquad (2)$$

$$y_0 = \frac{\sum_{x=1}^{n}\sum_{y=1}^{m} I(x, y)y}{\sum_{x=1}^{n}\sum_{y=1}^{m} I(x, y)}$$

In Formula 2, I (x, y) is the gray value of the pixel under the Gaussian convolution. x0 and y0 are the centroid coordinates of the spot.

Figure 6:
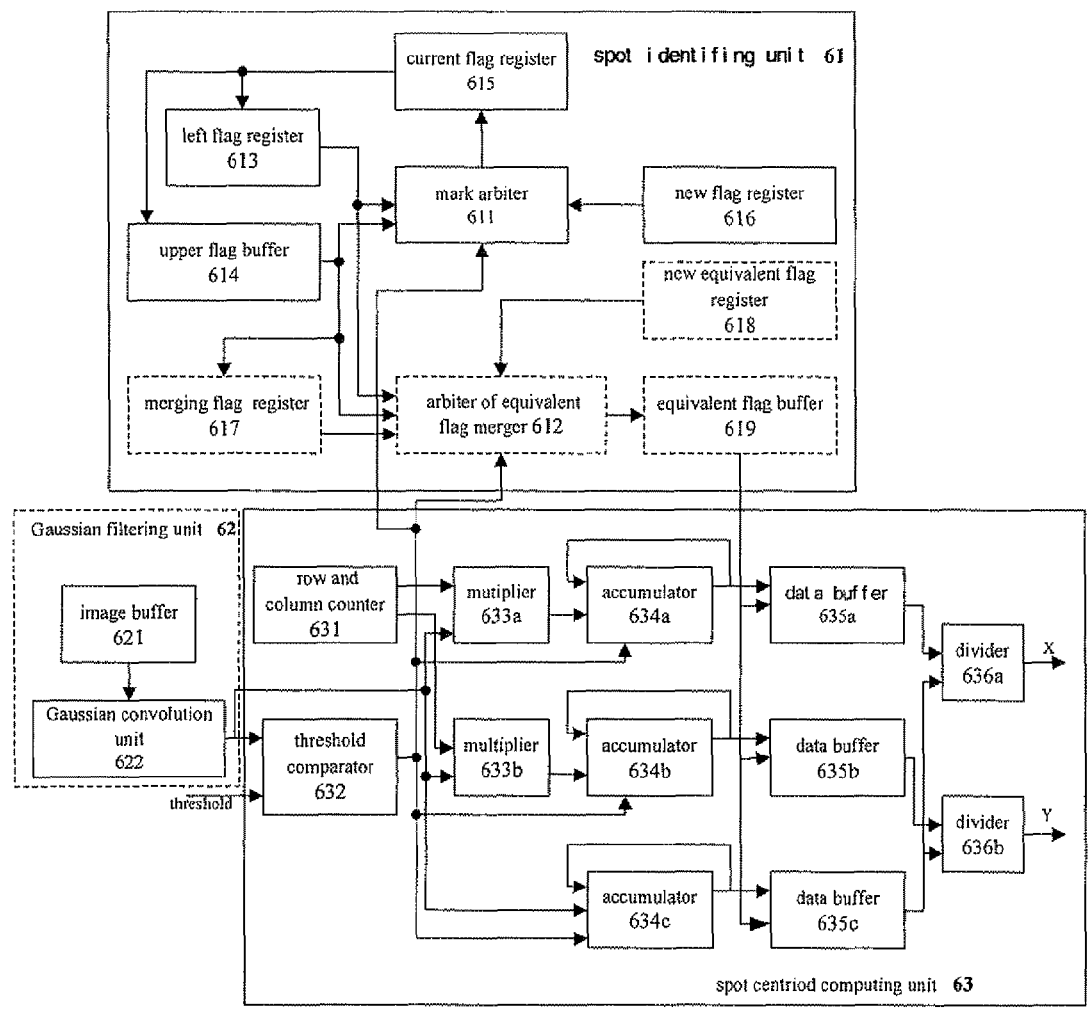
FIG. 6 is a schematic drawing of an embodiment of a centroiding system for spots image.

In order to implement this method real-time, a spot centroiding system is presented in this disclosure. As shown in FIG. 6, the system comprises: a spot identifying unit 61, a Gaussian filtering unit 62 and a spot centroid computing unit 63. The spot identifying unit 61 receives the control signal which is inputted from a threshold comparator 632 of the spot centroid computing unit 63, and marks pixels of the spots image, and merges the equivalent flags of the same spot. The spot identifying unit 61 further comprises: a mark arbiter 611, a left flag register 613, an upper flag buffer 614, a current flag register 615 and a new flag register 616, an arbiter of the equivalent flag merger 612, a merging flag register, 617, a new equivalent flag register 618 and an equivalent flag buffer 619.

The mark arbiter 611 marks the pixels with the left flag register 613, the upper flag buffer 614, the current flag register 615 and the new flag register 616, the flow as shown in FIG. 2.

The arbiter of equivalent flag merger 612 merges the equivalent flags of same spot with the left flag register 613, the upper flag buffer 614, the merging flag register, 617, and the new equivalent flag register 618, as shown in the detailed flow in FIG. 4. The merging results are saved in the equivalent flag buffer 619.

The current flag register 615, the left flag register 613, the upper flag buffer 614, the new flag register 616, the merging flag register, 617, the new equivalent flag register 618 and the equivalent flag buffer 619 provide the current flag, the left flag, the upper flag, the new flag, the number of equivalent flags which shall be merged, new equivalent flag and equivalent flag to the mark arbiter 611 and the arbiter of equivalent flag merger 612. The upper flag buffer 614 and the equivalent flag buffer 619 are configured for saving a group of flags, rather than for saving a single flag. The equivalent flag buffer 619 sends equivalent flags merged as the address to data buffers 635a, 635b and 635c.

If the merging is not needed, the arbiter of equivalent flag merger 612, the merging flag register 617, the new equivalent flag register 618 and the equivalent flag buffer 619 can be omitted.

The Gaussian filtering unit 62 is configured for convoluting the gray value of the pixel with Gaussian filter and transferring the result thereof to the spot centroid computing unit 63. The Gaussian filtering unit 62 further comprises an image buffer 621 and a Gaussian convolution unit 622. The image buffer 621 is configured for saving the gray value of the pixel temporarily and sending the gray value to the Gaussian convolution unit 622. The Gaussian convolution unit 622 is configured for doing the Gaussian convolution of the gray value of the pixel and sending the result thereof to a threshold comparator 632, multipliers 633a and 633b, and an accumulator 634c of the spot centroid computing unit 63.

The spot centroid computing unit 63 is configured for calculating the centroid of the spots image, then outputting the final result. The spot centroid computing unit 63 further comprises a row and column counter 631 for calculating and supplying a coordinate value of each pixel and providing an x and y coordinates value of each pixel to multipliers 633a and 633b respectively. The spot centroid computing unit further comprises the threshold comparator 632 for comparing results from the Gaussian convolution unit 622 with the predetermined threshold and then outputting the result of that comparison as the control signal to the mark arbiter 611, the arbiter of equivalent flag merger 612, and the accumulator 634a, 634b and 634c.

The spot centroid computing unit 63 further comprises multipliers 633a and 633b, accumulators 634a, 634b and 634c, the data buffers 635a, 635b and 635c, and dividers 636a and 636b. The multipliers 633a, 633b are configured for receiving the results of the Gaussian convolution unit 622 and the x and y coordinates from the row and column counter and outputting the product of the gray value of pixel and the coordinate value. The accumulators 634a, 634b and 634c are configured for receiving the outputting result from the threshold comparator 632 and outputting the accumulation of itself and accumulating the result from the multipliers 633a, 633b and the Gaussian convolution unit 622. Actually, the multiplier 633a and the accumulator 634a are configured for accumulating of the product of the gray value of pixels with an x coordinate value of the same spot, and saving the computed results in the data buffer 635a. The multiplier 633b and the accumulator 634b are configured for accumulating of the product of the gray value of pixels with a y coordinate value of the same spot, and saving the results thereof in the data buffer 635b.

The accumulator 634c is configured for accumulating the gray value of all pixels of the same spot, and saving the results in the data buffer 635c. The dividers 636a and 636b are respectively configured for calculating the quotient between the accumulation of the product of the gray value of pixels and x coordinate values and the accumulation of gray value of pixels and calculating the quotient between the accumulation of the product of the gray value of pixels and y coordinate values and the accumulation of gray value of pixels. Next, the dividers get the x and y coordinates of spot centroid. The multipliers 633a and 633b, the accumulator 634a, 634b and 634c, the data buffer 635a, 635b and 635c, the divider 636a and 636b are used to realize the calculation in formula 2.

The spots image centrioding system in this disclosure can be implemented by a field programmable gate array ("FPGA") or an application specific integrated circuit ("ASIC").

To locate a spot centroid, the system shown in FIG. 6 receives the gray value of pixels from a sensor, and saves the gray value in image buffer 621. Next, the gray value of pixels in image buffer 621 is sent to the Gaussian convolution unit 622 to realize Gaussian convolution and implement the Gaussian filtering. The result of the Gaussian convolution is inputted to the threshold comparator 632, which is compared with the predetermined threshold. Then, the threshold comparator 632 judges as to whether to carry out spot identification according to the compared results. If the comparator indicates that that spot identification should proceed, the threshold compared results are inputted into the mark arbiter 611 and the arbiter of equivalent flag merger 612 in the spot identifying unit 61 as a control signal, and the system starts to mark the spot image and merge equivalent flag. The detailed process of marking and merging are accomplished with the mark arbiter 611, the left flag register 613, the upper flag buffer 614, the current flag register 615 and the new flag register 616, the arbiter of equivalent flag merger 612, the merging flag register 617, the new equivalent flag register 618 and the equivalent flag buffer 619 according to the process flow as shown in FIG. 2 and FIG. 4. At the same time, accumulation of the product of the gray value of pixel and coordinate values and accumulation of the gray value of pixel and storage of the results are accomplished by the multipliers 633a and 633b, the accumulators 634a, 634b and 634c, and the data buffers 635a, 635b and 635c. When whole pixels of the image are processed, the x and y coordinate values of spot centroid are computed by dividers 636a and 636b. Then, x and y coordinate values of each pixel are provided by the row and column counter 631.

The advantages of the presented representative embodiment are as follows:

1) Gaussian weighing centroiding is introduced in this disclosure, which is, doing Gaussian convolution to the gray value of output pixel, then identifying the spots. Using this method, the ability of noise-resistance is improved and high precision is realized.

2) Each pixel is marked and disposed of correspondingly in this disclosure instead of being limited to a window, so all spots in the image can be identified and disposed of and the size and shape of spots are not restricted.

3) The same spot may have more than one equivalent flag, so the data of the spot may occupy more than one memory space. Therefore, in this disclosure equivalent flags of the same spot are merged when the pixels are marked. The data of the same spot is saved in the same memory space, so the spaces of memory are saved greatly.

4) The processing of marking pixels, merging equivalent flags, and calculating the centroid are done in parallel and implemented with FPGA (Field Programmable Gate Array) hardware, so the update rate can reach 30 MHz which enables real-time spots centrioding.

The foregoing description of various embodiments of the invention has been present for purpose of illustration and description. It is not intent to be exhaustive or to limit the invention to the precise embodiments disclosed. Numerous modifications or variations are possible in light of the above teachings. The embodiments discussed where chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A rapid and high precision centroiding method for determining a centroid of each spot in an image comprising one or more spots, the method comprising:
   for each pixel in the image, calculating a gray value of the pixel using a Gaussian convolution;
   when the calculated gray value does not exceed a predetermined threshold, marking the pixel with a zero;
   when the calculated gray value exceeds the predetermined threshold,
   marking the pixel with a flag, the flag equal to the first non-zero value of
      a flag of a left adjacent pixel,
      a flag of an upper adjacent pixel,
      and a new flag;
   calculating a product of the gray value and a coordinate value of pixel,
   merging the flags for pixels within the one or more spots by,
      for each flag on each pixel, determining whether the flag is an equivalent flag to the flag of another pixel, and, for each flag determined to be an equivalent flag, changing the value of the flag to be the same as the flag of the another pixel, thereby marking the pixels of each of the one or more spots with a flag of a common value, the common flag value being different from the common flag value of each other of the one or more spots;
   for each of the one or more spots and each flag value after the merging step, calculating a centroid of the spot by,
      for each flag value after the merging step, calculating a first sum of a product of the gray value and a coordinate value of each pixel having a common flag value;
   calculating a second sum of the gray value of each pixel having the common flag value; and
   saving the results in the data buffer,
   when all pixels of the image have been disposed completely, for each of the one or more spots, calculating a centroid of the spot by
      calculating a quotient of the first sum and the second sum; and
      outputting the quotients as centroid coordinates of each spot image.

2. The rapid and high precision centroiding method according to claim 1, wherein marking the pixel with a flag, merging the flags for pixels within the one or more spots and calculating the product of teh gray value and a coordinate value of the pixel is done simultaneously.

3. The rapid and high precision centroiding method according to claim 1, wherein before the step of calculating a gray value of the pixel using a Gaussian convolution the method further comprises: reading the gray value of the current pixel and saving the gray value in a buffer.

4. The rapid and high precision centroiding method according to claim 1, wherein the step of marking the pixel with a flag further comprises:
   updating the flags of the left adjacent pixel and upper adjacent pixel with the flag of the pixel.

5. The rapid and high precision centroiding method according to claim 1, further comprising clearing the flags of the upper adjacent pixel and left adjacent pixel.

* * * * *